May 25, 1943. R. W. KREBS ET AL 2,320,284
CATALYTIC CONVERSION
Filed Aug. 23, 1939
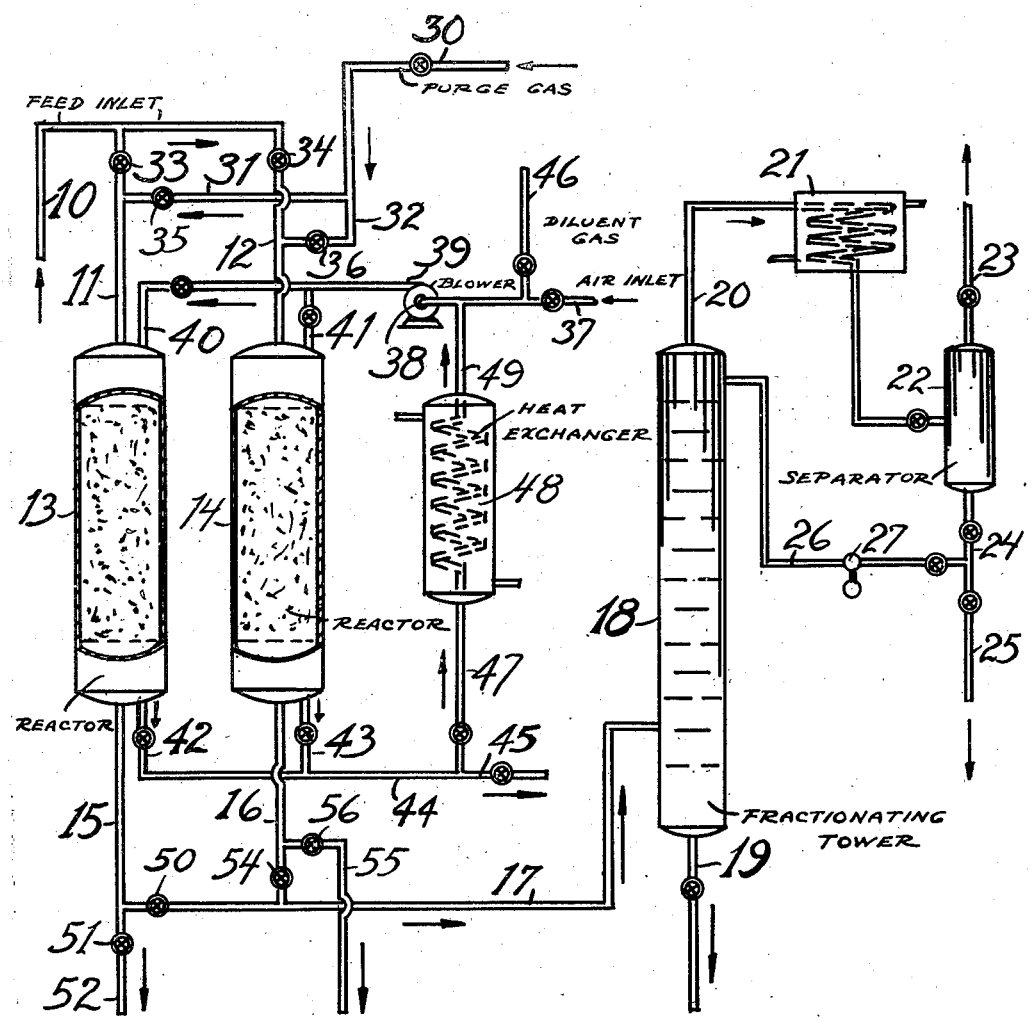
Robert W. Krebs
Edward W. Nicholson Inventors
By P. L. Young Attorney Patented May 25, 1943

2,320,284

UNITED STATES PATENT OFFICE 2,320,284

CATALYTIC CONVERSION

Robert W. Krebs and Edward W. Nicholson, Baton Rouge, La., assignors to Standard Oil Development Company, a corporation of Delaware Application August 23, 1939, Serial No. 291,460

4 Claims. (Cl. 196—52)

This invention relates to the catalytic conversion of organic compounds and pertains more particularly to a method of reducing the amount of carbonaceous deposits formed during the conversion treatment.

While the invention in some of its broader phases may have a more general application it is particularly adapted to processes involving catalytic cracking of hydrocarbon oils in which the solid contact mass is subjected to alternate periods of cracking and regeneration.

In the catalytic conversion of hydrocarbon oil at temperatures above active cracking temperature the catalyst mass more or less gradually becomes contaminated with carbonaceous deposits which reduce the activity of the catalyst. As a result it becomes desirable to regenerate the catalyst at periodic intervals to remove such carbonaceous deposits. In many cases the regeneration is accomplished in the same reaction zone in which the cracking process is carried out. This requires periodic interruption of the cracking reaction to accomplish the regeneration. In order that the cracking operation can be carried out continuously it is a common practice to provide a plurality of reaction chambers interconnected in parallel so that when it becomes desirable to carry out the regeneration of the catalyst in one reaction chamber the cracking reaction can be transferred from that reaction chamber to another containing fresh or regenerated catalyst. When operating in this way the catalyst masses in the individual reaction chambers are subjected to alternate periods of cracking and regeneration.

Following the cracking operation it is usually desirable to remove the cracked products from the reaction chamber before proceeding with the regeneration. Likewise following the regeneration operation it is also desirable in most cases to remove the gaseous products of regeneration prior to returning the reaction chamber to the cracking operation.

According to prior practices at the completion of the cracking period the reaction chamber was disconnected from the cracking operation by closing valves in the oil lines leading to and from the reaction chamber. Following this the reaction chamber was purged of residual cracked gases either by introducing an inert stripping gas such as steam, spent combustion gases, etc., or by evacuation of the chamber. During the period following the closing of the valves connecting the reaction chamber with the oil stream and the opening of the valves introducing the purging gas, the reaction chamber contains a stagnant body of oil vapors in close contact with the catalyst.

We have found that during this period, even though it may be very short, the oil vapors in contact with the catalyst are greatly overcracked, with the resultant formation of excessive amounts of coke and low molecular weight hydrocarbon gases and hydrogen. The over-cracking of these stagnant hydrocarbon vapors not only reduces the ultimate yield of gasoline obtained from a given amount of charging stock but also increases the length of time required for removing the carbonaceous deposits from the catalyst mass.

One of the primary objects of the present invention is to provide an improved method of carrying out an operation of the type hereinbefore described in which over-cracking of stagnant oil vapors in the reaction chamber between the cracking and purging period is avoided.

A further interrelated object of the present invention is to provide an improved method of the nature hereinbefore described in which the catalyst in the reaction chambers will not be exposed to a stagnant body of oil vapors between the cracking and purging periods and as a result excessive cracking during this period will be avoided.

The above and other objects of the invention will be apparent from the more detailed description hereinafter in which reference will be made to the accompanying drawing. This drawing is a diagrammatic illustration of an apparatus suitable for carrying the invention into effect.

Referring to the drawing the reference character 10 designates a feed line through which the oil to be cracked, preheated to the desired reaction temperature, is introduced into the system. The hydrocarbon oil is passed from line 10 through branch lines 11 and 12 to either of two reaction chambers 13 and 14 respectively, containing a mass of cracking catalyst. The reaction chambers may be of any suitable construction. For simplicity we have shown the reaction chambers as containing a solid bed of catalytic material. It will be understood however, that the catalyst may if desired be supported on a plurality of spaced trays within the reactor or the reaction chamber may be provided with suitable distributing pipes for passing the oil to be cracked throughout the bed of catalyst material.

The cracked products after passing through the reaction chambers 13 or 14 are withdrawn therefrom through lines 15 and 16 leading to line 17 from which they pass to a fractionating tower 18 for separation of the insufficiently cracked constituents. The condensate formed in the tower 18 is withdrawn through line 19 and may be rejected from the system. If desired this product may be subjected to further cracking treatment either in the same or different cracking equipment.

Vapors remaining uncondensed in the fractionating tower 18 are removed therefrom through line 20 and passed to a condenser 21 in which the desired distillate product is condensed. Products from the condenser 21 pass to a receiver 22 wherein the raw distillate separates from normally gaseous products. Gases separated in the receiver 22 are removed therefrom through line 23 and may be passed through a suitable absorption system (not shown) for the removal of gasoline constituents therefrom. The raw distillate collected in the receiver 22 is withdrawn through line 24 and may be passed through line 25 to a suitable treating equipment for further purifying and refining the product for the market. If desired a part of the raw distillate may be returned through line 26 and pump 27 to the top of the fractionating tower 18 as reflux therefor.

It will be understood in the preceding description that only one of the reaction chambers 13 or 14 is on the cracking operation at any one time and that the other is undergoing regeneration or purging treatment and that the cracking operation is transferred from one reaction chamber to another as the catalyst mass requires regeneration. For simplicity only two reaction chambers have been shown although it will be understood that any desired number may be employed depending upon the relative length of time required for carrying out the cracking and regenerating operations.

A purging gas for removing the cracked products at the completion of the cracking period is introduced through line 30 having branch lines 31 and 32 merging with lines 11 and 12 between valves 33 and 34 and the reaction chambers. The branch lines 31 and 32 are also provided with valves 35 and 36 respectively.

The gas employed for purging the reaction chamber of the cracked products following the cracking period may be any inert gas such as nitrogen, steam, spent combustion gases, carbon dioxide or the like.

The regeneration of the catalyst mass within the reaction chambers 13 and 14 may be accomplished by introducing an oxidizing gas such as diluted air. To this end an oxidizing gas such as air may be introduced through line 37 leading to the suction side of a blower 38 from whence it is forced through line 39 and branch lines 40 and 41 to the reaction chambers 13 and 14, respectively. Gaseous products of regeneration are removed from reaction chambers 13 and 14 through line 42 and 43. These gases may be passed through line 44 and rejected from the system through line 45.

In order to effect the control of temperatures during regeneration it is usually desirable to dilute the air with a suitable inert medium such as steam or spent combustion gases. The diluent may be introduced into the air stream from an extraneous source through line 46 or a part of the products of regeneration may be recycled as a diluting medium. In accordance with the latter practice a part of the spent regenerating gases from line 44 is passed through line 47 to a heat exchanger 48 in which the recycled gas is cooled to the desired extent after which it is passed through line 49 which merges with the air line 37 on the suction side of the blower 38.

As previously described, only one of the two reaction chambers 13 and 14 is adapted to be on the cracking operation at any one time. When it is desired to regenerate the catalyst in the reaction chamber on the cracking operation the valve interconnecting the reaction chamber with the oil stream is closed. For example, assume the reaction chamber 13 is on the cracking operation. Upon completion of the cracking operation, the valve 33 in line 11 leading from the feed line 10 and valve 50 in the line 17 leading to the fractionating tower 18 are closed.

In accordance with the present invention, we avoid the formation of a stagnant body of oil vapors within the reaction chambers following the cracking operation by simultaneously opening the valves in the purging line leading to the reaction chamber as the valves in the oil line are being closed. As a result the oil vapors are more or less gradually replaced by an inert medium. Consequently the hydrocarbon vapors do not remain stagnant within the reaction chamber. For example, again assume that the cracking operation is being completed in the reaction chamber 13. At the completion of the reaction operation the valve 33 in line 11 is gradually closed and the valve 35 in line 31 is simultaneously opened thus gradually replacing the oil vapors to be cracked, with the inert purging gas. During manipulation of the valves 33 and 35 the valve 50 in line 17 is maintained in opened position so that the products from the reaction chamber during this period are passed to the fractionating tower 18. If desired after valve 33 in feed line 11 has been closed the valve 50 may also be closed and valve 51 in line 52 simultaneously opened so that the fractionating tower is disconnected from the reaction chamber and the purging gases exhausted from the system through line 52.

The same mode of operation applies with respect to reaction chamber 14. For example, at the completion of cracking periods in the reaction chamber 14 the valve 34 in the feed line 12 is gradually closed and the valve 36 in the purge line 32 is simultaneously opened thus gradually replacing the oil vapors with an inert stripping medium. During this period the valve 54 in the line 16 may be open so that the products pass directly to the fractionating tower 18. After the valve 34 in the feed line 12 has been closed the valve 54 may be also closed disconnecting the reaction chamber from the fractionating tower and the purging gases may be thereafter vented from the system through line 55 having a valve 56.

According to another phase of the invention the oil vapor stream following the cracking operation is gradually replaced as previously described with a relatively stable normally gaseous hydrocarbon which does not undergo substantial cracking under the temperature conditions obtaining within the reaction chambers. Following the replacement of the hydrocarbon vapors with the relative stable hydrocarbon gases the reaction chamber is then purged of the hydrocarbon gases before beginning the regenerating operation. It is preferred however, to replace the oil vapors with a non-combustible inert gas directly so that no further purging treatment is required before beginning the regenerating treatment.

Having described the preferred embodiment of the invention it will be understood that it embraces such other variations and modifications as come within the spirit and scope thereof.

We claim:

1. In the catalytic conversion of hydrocarbon oils wherein the oil vapors to be converted are passed through a conversion zone containing a conversion catalyst for a predetermined period, after which the flow of oil vapors is discontinued and the conversion zone purged of oil vapors by passing an inert purging gas through the conversion zone; the method of preventing the retention of a stagnant body of oil vapors within the conversion zone during the manipulation of the valves controlling the flow of oil vapors and purging gas which comprises commingling an inert purging gas with the oil vapors passing through the conversion zone during the final stages of the conversion period and thereafter discontinuing the supply of oil vapors passing to the conversion zone while continuing the supply of purging gas to thereby remove volatile constituents from the catalyst within said conversion zone.

2. In the process defined by claim 1, the further improvement which comprises employing steam as the inert purging gas.

3. In the process defined by claim 1, the further improvement which comprises using spent combustion gases as a purging gas.

4. In the catalytic conversion of hydrocarbon oils wherein the oil vapors to be converted are passed through a conversion zone containing a conversion catalyst for a predetermined period, after which the flow of oil vapors is discontinued, the conversion zone purged of oil vapors by passing an inert purging gas through the conversion zone and the catalyst then regenerated to restore the activity thereof; the method of preventing the retention of a stagnant body of oil vapors within the conversion zone during the manipulation of the valves controlling the flow of oil vapors and purging gas which comprises commingling an inert purging gas with the oil vapors passing through the conversion zone during the final stages of the conversion period and thereafter discontinuing the supply of oil vapors passing to the conversion zone while continuing the supply of purging gas to thereby remove volatile constituents from the catalyst within said conversion zone.

ROBERT W. KREBS.
EDWARD W. NICHOLSON.